Figure 1:
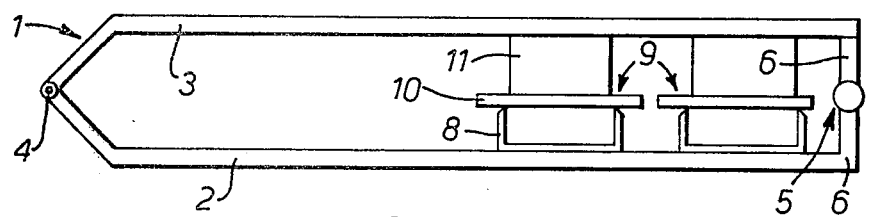

United States Patent [19]

Crane

[11] 4,251,480
[45] Feb. 17, 1981

[54] METHOD OF PRODUCING A DECORATED ARTICLE

[75] Inventor: John C. Crane, Links View, England

[73] Assignee: The Mettoy Company Limited, Northampton, England

[21] Appl. No.: 974,006

[22] Filed: Dec. 28, 1978

[51] Int. Cl.³ .......................... B29D 3/00; B29F 1/00
[52] U.S. Cl. .................................. 264/132; 264/135; 264/163; 264/245; 264/278
[58] Field of Search .............. 264/135, 138, 275, 278, 264/259, 328, 163, 161, 245, 132

[56] References Cited

U.S. PATENT DOCUMENTS

| | | | |
|---|---|---|---|
| 2,624,916 | 1/1953 | Persak | 264/328 |
| 2,796,634 | 6/1957 | Chellis | 264/163 |
| 3,072,969 | 1/1963 | Du Bois | 264/275 |
| 3,207,822 | 9/1965 | Makowski | 264/275 |
| 3,466,214 | 9/1969 | Polk et al. | 264/163 |
| 3,972,975 | 8/1976 | Noda | 264/275 |
| 4,104,349 | 8/1978 | Hillgenberg | 264/163 |
| 4,123,494 | 10/1978 | Evrard et al. | 264/328 |
| 4,144,303 | 3/1979 | Glatt et al. | 264/275 |

*Primary Examiner*—Donald J. Arnold
*Attorney, Agent, or Firm*—Watson, Cole, Grindle & Watson

[57] ABSTRACT

A mould for producing a decorated article has a base part with a mould cavity and a lid part co-operating with but being movable away from the base part, the surface of the lid part facing the base part being substantially planar or part-cylindrical and extending beyond the wall of the base part. The wall of the base part preferably has a knife edge for engagement with the lid part. The method of producing the article comprises the steps of locating in a predetermined position on the lid part a carrier having ink thereon, charging the base part with plastics material, locating the lid part in a predetermined position on the base part so that the carrier extends beyond the co-operating wall of the base part, and rotationally moulding the article.

3 Claims, 7 Drawing Figures

U.S. Patent  Feb. 17, 1981  Sheet 1 of 2  4,251,480

METHOD OF PRODUCING A DECORATED ARTICLE

This invention relates to rotationally decorated moulded articles and to a method and a mould for producing such articles.

Previously, decorated moulded articles have been produced by first moulding the article and printing the decoration thereon. This has proved expensive, particularly if multi-coloured printing is required.

In the case of decorated playballs, it is known to insert in the bottom of the mould before moulding a decorated insert of a plastics material which has the desired printing thereon, the material of the insert being compatible with that of the playball. When moulded, the insert is embedded in and fused with the finished playball. However, it is particularly difficult to properly locate and retain the insert in position.

An object of the invention is to provide a method by which a decorated article having a high level of quality can be produced relatively inexpensively. The method permits accurate location of the decoration of the article.

In accordance with one aspect of the present invention, there is provided a method of producing a decorated article using a mould comprising a base part with a mould cavity and a lid part co-operating with but being movable away from the base part, the surface of the lid part facing the base part being substantially planar or part-cylindrical, characterised in that the method comprises the steps of locating in a predetermined position on the lid part a carrier having ink thereon, charging the base part with plastics material, locating the lid part in a predetermined position on the base part so that the carrier extends beyond the co-operating wall of the base part, and rotationally moulding the article.

In accordance with another respect to the invention, there is provided a method, wherein the co-operating wall of the base part has a knife-edge, characterised in that the method includes the step of removing after moulding the portion of the carrier which extends beyond the co-operating wall of the base part and which has been scored or cut through by the knife edge during moulding.

Preferably, the co-operating walls of the base mould part present a knife edge which is engageable with the lid part, the knife edge scoring or cutting through the carrier during moulding to avoid the necessity of precutting the carrier to the shape of the base part of the mould.

The knife edge is preferably of a thickness less than 1/32 inches (0.794 cm).

The carrier can be of any simple shape, for example rectangular, and is preferably located relative to the lid part by suitable locating means, for example projections on the lid part which co-operate with holes in the carrier.

The carrier is preferably plastics material which is during the moulding operation fused with the plastics material of the article. The carrier plastics material is preferably transparent and may be above the ink layer in the finished article, in which case it forms a protective layer. It is presently preferred, however, that the carrier plastics material is below the ink layer in which case it serves to bond the ink layer to the substrate of the article and it may be opaque.

At least part of the surface of the lid part is preferably polished to enable the carrier to be attached thereto by suction. The polished surface provides a gloss finish on the corresponding surface of the article. The surface may be formed on a removable support plate which supports the carrier facing the base part.

Such surface may be etched or engraved to provide a relieved pattern on the corresponding surface of the article. The surface may additionally or alternatively have recesses which will be filled during moulding by the plastics material in the mould and which provide protuberances on the surface of the article for a further decorative effect.

In accordance with another aspect of the invention, there is provided an article made in accordance with the method of the invention.

Figure 2:
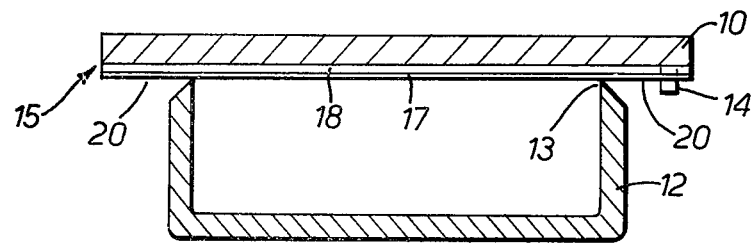
Figure 3:
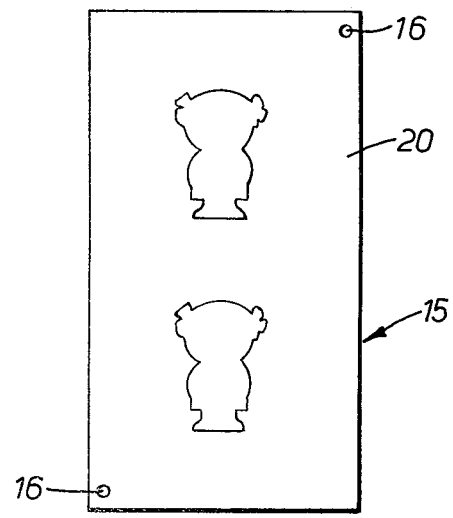
Figure 4:
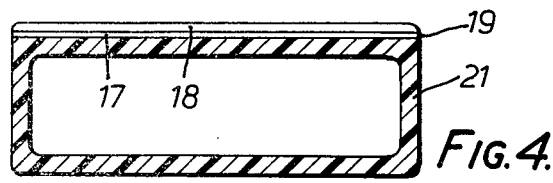
Figure 5:
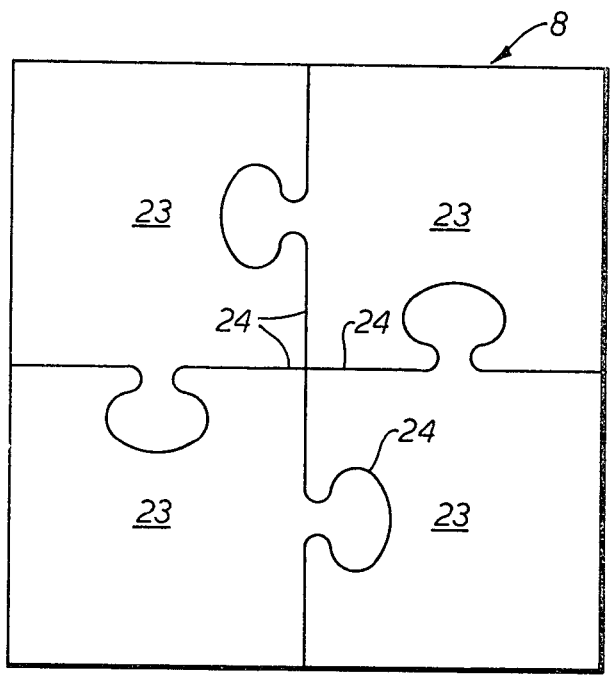
Figure 6:
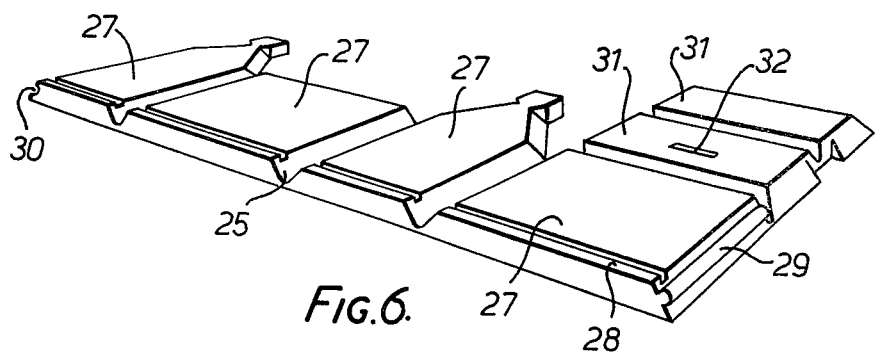
Figure 7:
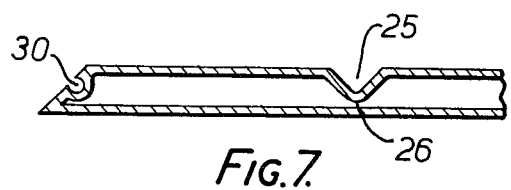

An embodiment of the invention will now be described, by way of example, with reference to the accompanying drawings, in which:

FIG. 1 is a side elevation of a moulding apparatus having a plurality of moulds, FIG. 2 is a diagrammatic cross-sectional view of a mould of FIG. 1, FIG. 3 is a plan view illustrating a printed carrier sheet for use with the moulds, FIG. 4 is a cross-sectional view of an article formed using the mould of FIG. 2, FIG. 5 is a plan view of a base part of a modified mould for making interlocking articles, FIG. 6 is a perspective view of a blank formed in accordance with the invention for producing a toy house, and FIG. 7 is an enlarged detail cross-sectional view of part of the blank of FIG. 6.

The moulding apparatus compises a frame 1 having two arms 2,3 which are pivotally interconnected by a hinge 4 at one end and which have at the other end a releasable connection 5 which may take any suitable form, for example a bolt spacing through co-operating eyes formed in depending members 6. One arm 2 of the frame has attached thereto base parts 8 of moulds 9 and the other arm 3 carries lid parts 10 of the moulds, the lid parts being attached to the arm 3 by supports 11. Preferably, the frame has eight moulds 9 arranged in two side-by-side rows of four, in which case one lid part 10 may co-operate with two side-by-side base parts.

As best seen in FIG. 2, the upper edge of the side wall 12 of each base part 8 is formed as a knife edge 13 which co-operates with the lid part 10.

The lid part 10 has two spigots or projections 14 which serve to locate a carrier sheet 15, such as is illustrated in FIG. 3, in which locating holes 16 have been punched. Alignment of the holes 16 with the projections 14 ensures that the carrier sheet 15 will be properly located for the moulding process as will be described below.

The carrier sheet 15 comprises a thin plastics layer 17 having printing 18 thereon and at least part of the lower surface of the lid part is polished to permit the unprinted zone of the carrier sheet to adhere by suction to the lid part. Preferably that part of the lid adjacent the printed zone on the carrier sheet is also highly polished to provide a high gloss finish on the printed part of the finished article.

To mould the article the arms 2,3 of the frame are unlocked and the frame opened to permit each carrier sheet 15 to be located on a lid part 10 using the locating projections and holes. Each carrier sheet is smoothed out to remove any air bubbles between the lid part 10 and the carrier sheet 15, which adheres to the lid part by suction. Plastics material to form the base or substrate 21 of the article, which is for example polyvinyl chloride (P.V.C.) in the form of powder or plastisol, is introduced into each mould base part 8, and the arms 2, 3 closed and locked together so that they attain the predetermined positions illustrated in FIG. 1. The connection of the arms of the frame ensures that the lid parts and corresponding base parts are in perfect register and the printing 18 is correctly positioned with respect to the mould base part 8.

The mould assembly is rotated and heated in known manner and during the moulding process the knife edge 13 of each mould scores or cuts the carrier sheet along the edge 19 of the finished article. During the moulding process the carrier sheet 15 acts as a gasket between the base and lid parts of the mould and prevents leakage of the material from within the mould.

After moulding, the frame is opened and each article is removed from its mould and the outer part 20 of the carrier sheet beyond the edge 19 of the finished article is simply removed by hand without the need for a further cutting operation. Although shown as a sharp edge, the knife edge 13 may have a substantial thickness and yet still cut or score the carrier sheet. For example, the thickness of the knife edge may be about 1/32 inches, (0.794 cm).

In the illustrated embodiment, the plastics layer 17, which is preferably of P.V.C. or other material compatible with the material in the mould, is located adjacent the base part with the ink layer 18 in contact with the lid part. It has been found that the ink layer 18 and the plastics layer 17 tend to fuse with each other and with the substrate 21 and the ink layer 18 is practically irremovable.

Optionally, the ink layer could be facing the base part. In this case, the fusion of the ink layer and plastics layer with the substrate is not so good and it is possible, although difficult, to insert an implement or fingernail beneath the ink layer in the finished article and lift the layer away from the substrate 21.

FIG. 5 illustrates a modified form of mould base part which is divided into sections 23 by internal walls 24 arranged to provide any desired shape of sections. The walls are preferably less than 1/32 inch (0.794 cm) thick and have the same effect of scoring or cutting the carrier sheets as the knife edges 13 of the side walls of the base part.

The sections 23 are preferably of the same volume, and may conveniently be the same shape, and equal amounts of plastics material are introduced into the respective sections to provide the substrate. The moulding operation is similar to that described above.

It will be appreciated that utilising this mould base part the finished article comprises a plurality, four as illustrated, of parts which interlock in the manner of jigsaw pieces. When interlocked the printing of one part registers perfectly with the printing of an adjacent part. Furthermore the gap if between the parts which is the same as the thickness of walls 24 facilitates assembly and separation of the parts.

FIG. 6 shows an article which is formed using a mould base part similar to that of FIG. 5, but in which dividing walls 24 are an inverted V-shape and do not engage with the lid part during the moulding process. The resultant article has V-shaped grooves 25 so that each section is separated by a thin portion 26 of material which forms a hinge.

The illustrated article is in the form of a blank for construction into a house, the printing on the undersurface of the blank, as seen in FIG. 6, being of brickwork, doors and windows etc, to be visible when the blank is made up.

To make up the blank, each of the wall sections 27 is folded about its hinge and a base (not shown) is inserted in a groove 28 formed in each wall section. The end wall sections have locking means, in the illustrated case in the form of co-operating tongue 29 and groove 30, which lock the end wall sections together. The roof sections 31 are then folded over about their hinges 26 and locked in places by suitable locking means (not shown) or by adhesive. The house may be used as a money box in which case a slot 32 is provided in the roof.

It will be appreciated that although a blank for a house is illustrated, other articles, for example a boat or a train, could be made from suitable blanks.

Instead of polishing the inner surface of the lid part 1 of a removable polished plate, which can be readily replaced, may be attached to the underside of the lid part.

Furthermore, the polished surface may be engraved or be provided with recesses to provide a relieved surface on the finished article.

Although described as flat, such surface may be part cylindrical.

The above-described method can be carried out by relatively unskilled operatives. The carrier sheet need only be located on a similar sized and shaped lid part using the simple locating means. After the moulding operation and release of the article from the mould, it is necessary only to remove the flashing of the carrier sheet, which is scored or cut through to permit easy removal.

The moulded article may be provided with a "squeaker" in known manner and may take any suitable form or shape. In a particular example the article is in the shape of the outline of a cartoon-type character and the printing can provide precise detail of the character. In another example, the article takes the form of a greetings card with the printing taking the form of a picture and suitable wording.

The printing may be in any desired combination of colours.

It will be appreciated that the bottom wall of the base part 8 of each mould may be provided by a part (not shown) similar to lid part 10 to enable an article with decoration on both sides to be produced. The bottom wall may receive a carrier having a decoration which is the same as, or different from, the decoration on the lid part 10. The part forming the bottom wall may have some or all of the features of the lid part 10 described above.

The above-described article has a level of quality which has hitherto proved impracticable.

What I claim is:

1. A method of producing a decorated hollow article using a mould comprising a base part having a side wall defining a mould cavity and a lid part co-operating with but being movable away from said base part and having a surface facing said base part, said surface being one of substantially planar or part-cylindrical, and said side wall having a cutting edge directed outwardly toward said lid part, wherein said method comprises the steps of locating in a fixed predetermined position on said lid part a carrier of plastic material having decorative ink thereon facing said surface of said lid part, disposing said carrier between said cutting edge and said lid part, charging said base part with plastic material to form a body of the hollow article, locating said lid part in a predetermined position on said base part so that said carrier extends beyond said co-operating wall of said base part, severing said carrier at least partially between said cutting edge and said lid part, rotationally moulding the article in the pressure of heat, and then removing that portion of said carrier which extends beyond said sidewall and which has been severed by said cutting edge whereby the decorated article produced has said carrier and ink thereon fused with each other and with the charging material.

2. A method according to claim 1, wherein said decorative ink is printed on said carrier.

3. A method according to claim 2, wherein at least a part of said surface of said lid part is polished, and including the step of securing the plastics carrier to the polished part of the surface by suction.

* * * * *